July 4, 1950  
D. TENNEY  
MEANS FOR PRODUCING BREAD DOUGH IN A MIXER AT PREDETERMINED TEMPERATURES  
2,514,301

Filed March 27, 1945  
2 Sheets-Sheet 1

Inventor  
D. TENNEY  
By Malcolm H. Gannett  
Attorney

July 4, 1950
D. TENNEY
2,514,301
MEANS FOR PRODUCING BREAD DOUGH IN A MIXER AT PREDETERMINED TEMPERATURES
Filed March 27, 1945
2 Sheets-Sheet 2
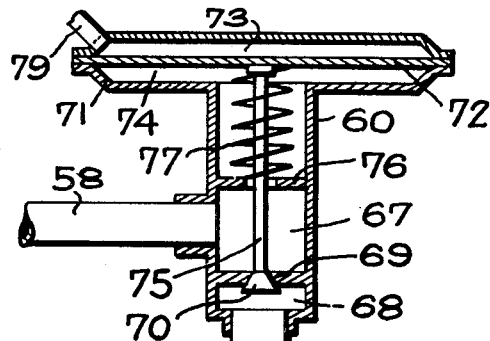
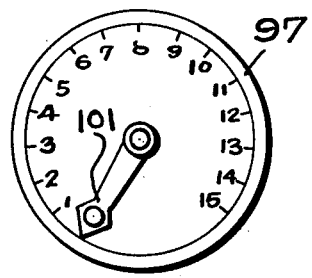
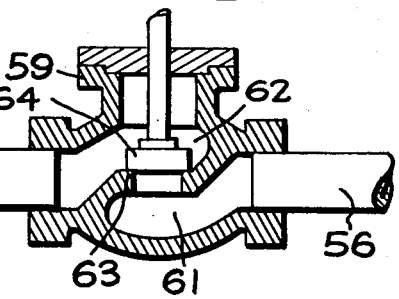
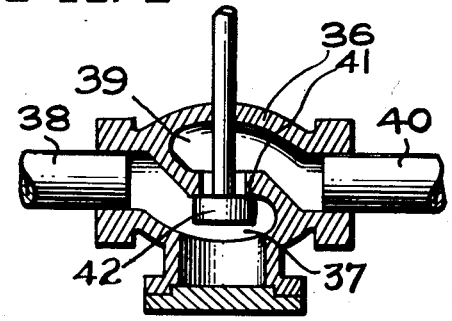
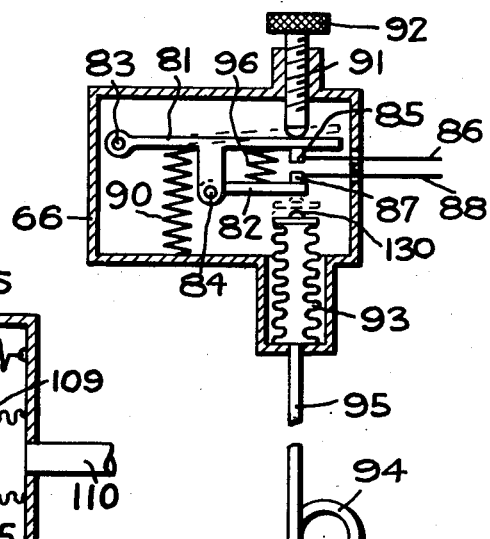
Inventor
D. TENNEY
By Malcolm F. Gannett
Attorney Patented July 4, 1950

2,514,301

UNITED STATES PATENT OFFICE 2,514,301

MEANS FOR PRODUCING BREAD DOUGH IN A MIXER AT PREDETERMINED TEMPERATURES

Dwight Tenney, Verona, N. J., assignor, by mesne assignments, to The Standard Stoker Company, Inc., New York, N. Y., a corporation of Delaware Application March 27, 1945, Serial No. 585,078

13 Claims. (Cl. 62—1)

This invention relates to the manufacture of bread dough.

An object of the invention is to provide an improved means by which batches of bread dough and like substances can be mixed uniformly at a predetermined temperature.

Another object of the invention is to provide an improved means for producing bread dough in a mixer at a predetermined temperature wherein a coolant liquid is adapted to be circulated through the mixer jacket for a predetermined period of time during a portion or all of the mixing operation.

Another object of the invention is to provide an improved means for producing bread dough in a mixer at a predetermined temperature in which the coolant liquid, consisting of an aqueous organic solution which is maintained at a substantially fixed temperature, is adapted to be circulated through a chamber enclosing the metallic heat transfer surface of the mixer bowl for a predetermined period of time during the mixing operation.

With the foregoing and other objects and advantages in view, the invention consists in the preferred construction and arrangement of the several parts which will be hereinafter fully described and claimed.

In the accompanying drawings—

Fig. 2 is an enlarged vertical sectional view of the valve device for controlling the recirculation of the coolant liquid in the refrigerated storage tank;

Fig. 3 is an enlarged vertical sectional view of the expansion valve device and the electrically operated valve device associated therewith;

Fig. 4 is an enlarged vertical sectional view of the thermostat switch device;

Fig. 5 is an enlarged vertical sectional view of the high-low pressure switch device; and Fig. 6 is an enlarged front elevation of the timer device.

Figure 1:
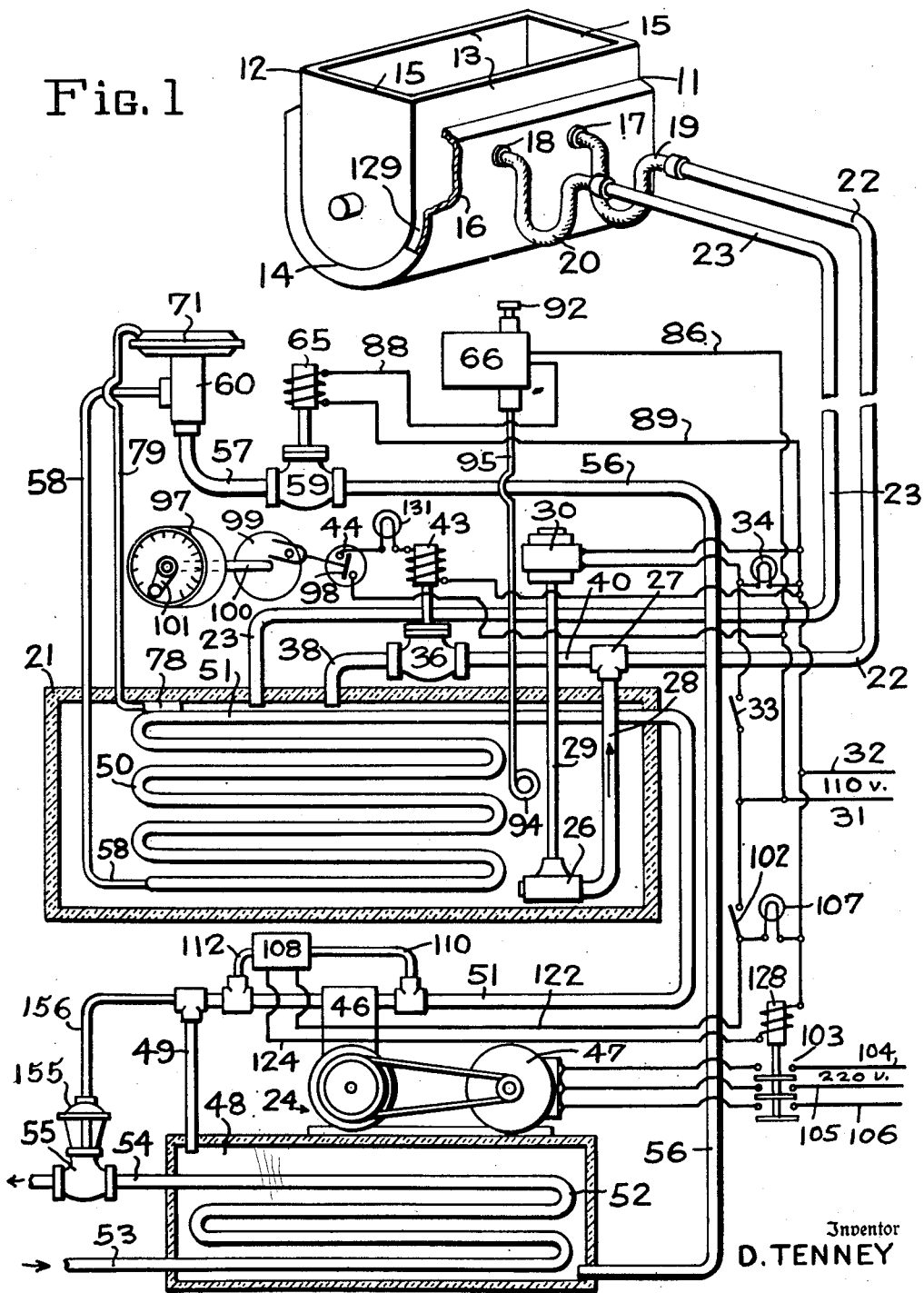
Fig. 1 is a diagrammatic view of a dough mixer and the means associated therewith by which batches of dough are adapted to be produced at desired temperatures in accordance with the present invention.

In order to obtain uniform fermentation, as regard to time and quality, bread dough should be proofed under uniform conditions. This necessitates setting the bread doughs at a fixed temperature day after day both winter and summer and irrespective of variations in atmospheric temperatures.

The setting temperature of the dough when it is discharged from a mixer is dependent primarily upon the temperature of the flour and the temperature of the water used as ingredients, the length of time of the mix, and the temperature of the walls of the mixing bowl in which the mixing takes place.

The temperature of the flour will vary winter and summer depending upon where and how the flour is stored. The heat produced by the work of mixing depends largely on the mixing time, and since it requires a predetermined length of time to properly mix the ingredients, the amount of mixing time cannot be altered. From these facts it will thus be noted that the only two practical controllable elements are, (1) the temperature of the ingredient water, and (2) the temperature of the mixing bowl, or rather the temperature of the metallic heat transfer surface provided by the walls of the mixing bowl with which the dough comes in contact during the mixing operation.

In the early days of mass baking production, mixers were unjacketed, and the temperature of the dough was controlled by substituting varying amounts of ice for equal weights of water ingredient. This method was never very satisfactory, as it involved weighing the ice for each batch, and substituting an equal amount of ingredient water. Also, ice had to be available and had to be broken up.

The next development in the art of bread dough mixing consisted in enclosing the side walls and bottom wall of the mixing bowl in a jacket, and circulating chilled water or refrigerated brine through the jacketed space or chamber. This involved the introduction of mechanical refrigeration, and with mechanical refrigeration available, not only were the mixer jackets cooled, but the ingredient make-up water was also chilled.

An early method of securing the desired refrigeration effects was to install in the basement of the bakery, a large tank which contained a heavy calcium chloride brine solution. In this tank were located refrigeration coils, through which expanding ammonia was passed, the vapors being compressed by a large compressor, placed adjacent to the tank. The brine was chilled to anywhere from zero degrees F. to minus 20 degrees F., and was then pumped to the several dough mixers and water coolers. This method was awkward because the same source furnished refrigeration for numerous purposes, and control of individual units was almost impossible. The handling of brine was also cumbersome. The pumps had to be insulated, and with the ever present danger of leakage and creepage, the maintenance of these systems was expensive and not simple.

Brine is corrosive, and although retardants can be introduced therein, brine will badly pit the mixing bowl jacket and all other metal parts with which it comes in contact. Consequently, this corrosive effect is a serious drawback to the use of brine.

Furthermore, the chilling of ingredient water had to be carefully handled because if for any reasons the controls failed to function in the required manner, the fresh water would freeze. When this freezing of the ingredient water occurred, if no damage resulted to the equipment itself, it always required a considerable amount of time to thaw the system and get the same again in running condition.

The next step taken by some bakers was to install Baudelot coolers by which the fresh ingredient water was chilled directly from the refrigerated coils. By this method water can be cooled to a temperature of 33 degrees F. to 35 degrees F. which is seven to ten degrees cooler than is considered safe by any other method. However, by using water having a temperature of approximately 34 degrees F. for both ingredient water and for circulation through the jacketed space of the mixer, under summer temperature conditions ice had to be added in order to secure the desired dough temperature.

This has led in recent years to the development of the refrigerated mixer jacket in which the refrigerant in the form of methyl chloride or Freon is expanded directly in the jacketed chamber surrounding the mixer bowl. With this system plenty of refrigeration effect can be obtained, and if it were not for the mechanical set-up and problem of control, this would be an ideal system.

However, certain disadvantages arise when a refrigerant is expanded directly in the jacketed chamber surrounding a mixer bowl.

First, Freon at summer temperatures generates a high pressure, and for this reason the systems in which it is used must be constructed to withstand pressure of at least two hundred pounds per square inch. This means that the mixer bowls must be especially constructed of very heavy and strong material, which is expensive.

Second, because a large number of dough mixers have bowls that tilt to facilitate the discharge of the dough, all fluid connections to the jackets must be flexible. Mechanically it is very difficult to secure a flexible fluid connection that will give good use constantly under two hundred pounds per square inch gas pressure. Such fluid connections may stand up for short periods of time, but if the least leak occurs, the entire refrigeration charge is lost.

Third, in mixing bread doughs, there is very little heat generated during the first sixty per cent. to seventy-five per cent. of the mixing time. It is only after the gluten starts developing that the real work has to be applied. In other words, only during the last five or six minutes of the mixing time is there any appreciable refrigeration required. This introduces two very detrimental factors:

(a) As a direct expansion system cannot store up refrigerating effect, the system must be built large enough to handle all the necessary heat removal concurrently with the generation of heat during the mixing operation. For example, if three doughs per hour are being processed, the refrigeration is confined to three six minute periods during the hour, or eighteen minutes out of sixty minutes, and the refrigeration machine will be idle during the remaining forty-two minutes. Consequently, a very large refrigerating machine is required.

(b) With the load coming in peaks, it is extremely difficult to control the flow of refrigerant, with the result that there is always the constant fear that liquid refrigerant may flow back to the compressor and cause serious damage to the machine. Bakers can produce good bread, but generally speaking, they are not refrigeration engineers and cannot always be on the lookout for troubles they do not understand.

(c) Heat transfer from refrigerant gas to metal is not nearly as efficient as the heat transfer from liquid to metal.

The improved means of the present invention are designed to overcome the disadvantages of the apparatus heretofore utilized in the art, so that bread dough can be produced commercially in large quantities uniformly at predetermined or desired temperatures in a more simple and economical manner.

Referring to the drawings, the present invention is shown in connection with a mixer machine 11, of the type especially designed for mixing and kneading bread dough.

The mixer machine comprises the usual bowl or receptacle 12, in the nature of a deep tank which forms the mixing chamber in which is contained the materials to be operated upon.

The bowl 12 has side walls 13, a substantially semi-circular bottom wall 14, and end walls 15.

The side walls 13 and the bottom wall 14 of the bowl constitute a metallic heat transfer surface which is enclosed by a jacket or shell 16 that provides a fluid tight chamber 129 for a cooling liquid or coolant.

Connected to the jacket or shell 16 and leading from the chamber 129, is a pair of pipes 17, 18. These pipes are formed with flexible sections 19, 20, respectively, so as to permit tilting movements of the mixer bowl 12, in well known manner, from a mixing position to a discharge position and vice versa.

The means for cooling the jacketed chamber 129 of the mixer comprises, an insulated tank 21 having fluid connection with said chamber through pipes 22, 23, which pipes are connected to the flexible pipe sections 19, 20, respectively; a refrigerating system, generally indicated at 24, and operatively connected to the tank 21 for maintaining the coolant liquid in said tank at the desired temperature; means for controlling the flow of liquid between the tank 21 and the mixer chamber 129; and means for controlling the operation of the refrigerating system.

The coolant liquid contained in the tank 21 and adapted to be circulated therefrom through the mixer chamber 129 should preferably be an aqueous organic solution having a characteristic by virtue of which the freezing point of water can be depressed to a predetermined temperature. In actual practice the coolant liquid has consisted of a 38% propylene glycol solution.

When the apparatus is shut down the coolant liquid in tank 21 will be at approximately room temperature. On the other hand, during operation of the apparatus the coolant liquid is maintained at a predetermined low temperature (less than 32 degrees F., or less than the freezing point of water), and consequently the tank 21 should be constructed of suitable insulation material so that heat cannot penetrate to the interior thereof and cause unnecessary increases in the temperature of the coolant liquid within the tank.

Within the tank 21 is a pump 26, which is preferably placed at or adjacent to the bottom of the tank so that the inlet side of the pump will receive the chilled liquid in the bottom of the tank.

The discharge side of the pump 26 is connected to a T 27 in pipe 22, by a pipe 28.

The impeller shaft 29 of the pump 26 extends upwardly through the top of the tank 21, and a suitable electric motor 30 is mounted on the upper end of said shaft for operating the pump impeller.

The pump motor 30 may be of any suitable type, said motor being adapted to be supplied with current from a suitable source of power supply, such as the lines 31 and 32, under the control of a switch 33.

An incandescent lamp 34 is interposed in the pump motor circuit between the switch 33 and the pump motor, said lamp being illuminated when the switch is closed so as to indicate to an operator that the pump is operating.

During the operation of the apparatus, when the coolant liquid in tank 21 is not being circulated to the mixer bowl chamber 129 by pump 26, the coolant liquid is adapted to be recirculated in the tank 21. Consequently, for the purpose of controlling the manner in which the coolant liquid is circulated by pump 26, a valve device 36 is provided.

As shown in Fig. 2, the valve device 36 comprises a valve body having a lower chamber 37 connected to the upper portion of tank 21 by a pipe 38, and an upper chamber 39 connected to the T 27 by a pipe 40.

The chambers 37 and 39 are separated by a wall having a passage formed therein defining a valve seat 41 for a valve 42 disposed in chamber 39.

Extending upwardly from the valve 42 is a stem which is fixed to the plunger of a solenoid or relay device 43.

The energization of the solenoid device 43 is controlled by a switch device 44 operated in the manner to be hereinafter described. The valve 42 is held against its seat 41 when the solenoid 43 is energized, thereby cutting off communication from the discharge side of the pump 26 to the top of the tank 21 through pipes 28, 40 and 38. When the solenoid 43 is deenergized the valve 42 is free to move downwardly away from its seat 41 and is normally unseated during operation of the apparatus.

A conventional form of refrigerating system is illustrated, in which a compressor 46 is adapted to be operated by an electric motor 47.

The high pressure side of the compressor 46 is connected to a combined refrigerant receiver-condenser 48, by a pipe 49.

The low pressure side of the compressor 46 is connected to a refrigerant evaporator 50 in tank 21, by a pipe 51.

The combined receiver-condenser 48 in the instant case is adapted to be cooled by water circulated through condenser 52, having an inlet water pipe 53 and an outlet water pipe 54 connected thereto.

Pipe 54 is provided with a suitable control valve device 55 for regulating the flow of water through the condenser 52. The valve 55 is normally closed, however, when compressed refrigerant gas is delivered from compressor 46 to the receiver-condenser 48 through pipe 49, circulation of cooling water through condenser 52 is desired. Opening of valve 55 is effected through any suitable well known pressure responsive diaphragm device 155 incorporated with valve 55, by means of the pressure of the refrigerant gas in the branch pipe 156.

The receiver 48 is connected to the evaporator 50 by a pipe including the several sections indicated by reference numerals 56, 57 and 58.

Interposed in the pipe line between sections 56 and 57, is a solenoid operated valve device 59, and interposed in the pipe line between sections 57 and 58, is an expansion valve device 60.

Valve device 59 provides means independent of the expansion valve device 60 for controlling the flow of refrigerant in the manner to be hereinafter described.

As shown in Fig. 3, the valve device 59 comprises a valve body having a lower chamber 61 connected to pipe 56, and an upper chamber 62 connected to pipe 57.

The chambers 61 and 62 are separated by a wall having a passage formed therein defining a valve seat 63 for a valve 64 disposed in chamber 62.

Extending upwardly from the valve 64 is a stem which is fixed to the plunger of a solenoid or relay device 65.

The energization of the solenoid 65 is controlled by a thermostat switch device 66, in the manner to be hereinafter described. Valve 64 is adapted to be held unseated from seat 63 when the solenoid 65 is energized, whereby refrigerant can flow from pipe 56 to pipe 57.

As shown in Fig. 3, the expansion valve device 60 comprises a valve body having an upper chamber 67 connected to pipe 58 and a lower chamber 68 connected to pipe 57.

The chambers 67 and 68 are separated by a wall having a passage formed therein defining a valve seat 69 for a valve 70 disposed in chamber 68.

For the purpose of operating the valve 70, fluid pressure responsive means consisting of a diaphragm device 71 is employed.

The diaphragm device 71 has a diaphragm 72 mounted in a casing between two chambers 73 and 74, said diaphragm being connected to the stem 75 of valve 70.

The valve stem 75 passes through an opening in a wall 76 which separates the upper valve chamber 67 from the lower diaphragm chamber 74.

Encircling the valve stem 75 and bearing at one end against the diaphragm 72 and bearing at the other end against the wall 76, is a coil spring 77.

Chambers 67 and 74 are connected so that the fluid pressure in both chambers is always the same. The valve 70 is held seated by the excess of pressure of the fluid in chamber 74 plus the pressure of spring 77 over the pressure of the fluid in the upper diaphragm chamber 73.

Diaphragm chamber 73 is connected to a feeler bulb 78 (Fig. 1), disposed in the tank 21, by a pipe or conduit 79. The feeler bulb 78 should be in close contact with and tightly secured to the suction line or pipe 51, as shown. When the superheat in the suction line pipe 51 in tank 21 exceeds a predetermined amount the increased pressure will be transmitted through pipe 79 to diaphragm chamber 73 and the diaphragm 72 will be operated to unseat the valve 70. Thus, when the increased pressure in chamber 73 is sufficient to overbalance the combined pressures of the fluid in diaphragm chamber 74, plus the pressure of spring 77, valve 70 will be held unseated, for a purpose described below.

During operation of the mixer machine 11, the coolant liquid in tank 21 is adapted to be circulated through the mixer chamber 129 periodically for predetermined periods of time. Valve device 36 controls the flow of liquid between tank 21 and chamber 129, and in order that the operator or baker can accurately control the periods of time in which it is desired the coolant liquid to be circulated through the mixer chamber 129, switch device 44, which controls the operation of valve device 36, is adapted to be actuated by a suitable timer device 97.

Any suitable type of timer may be employed. The timer should comprise suitable mechanism by which the movable arm 98 of the switch 44 is snapped into engagement with the fixed contact points of said switch so as to close the electric circuit by which the solenoid 43 is energized. The timer should also be constructed so that at the end of each period of time the switch 44 is closed the movable arm 98 will be disengaged or unsnapped from the fixed contact points of said switch, thereby opening the circuit so that the solenoid 43 is deenergized.

In the instant case, the timer 97 is shown as comprising a switch operating member 99 which is actuated by a shaft 100 of the timer mechanism proper. The timer 97 has a dial or face having indicia thereon for indicating periods of time, and a hand 101 rotatably mounted in front of said dial and adapted to be moved from a zero position to any desired time indicating position as shown by the dial.

*Refrigerant cycle*

There are two distinct and separate fluids circulating in the system, namely, (a) the refrigerant which is preferably Freon, a colorless, odorless, non-toxic liquid; and (b) the coolant liquid or aqueous organic solution heretofore referred to, which is contained in the tank 21.

To put the refrigeration cycle in operation, switch 102 is operated thereby closing the electric circuit through which the magnetic switch device 103 of the motor 47 is energized, whereby said motor is supplied with current from power lines 104, 105 and 106, in well known manner.

In the present instance it should be noted that the apparatus requires two separate sources of electric energy, namely, the 110 volt power lines 31, 32, and the 220 volt power lines 104, 105 and 106. All electrical equipment with the exception of the compressor motor 47 is adapted to be actuated with energy supplied by the 110 volt power lines 31 and 32.

When switch 102 is closed an incandescent lamp 107 will be illuminated so as to indicate to the operator that the compressor motor control circuit is operating or functioning.

When the compressor 46 is first started up a partial vacuum will be created in the entire refrigerating system between the expansion valve device 60 and the suction valve on the compressor 46. This is known as the "low side." Between the head of the compressor 46 and up to the expansion valve device 60 will be called the "high side."

The refrigerant flows from the receiver-condenser 48 through pipe 56, valve device 59, and pipe 57 to the expansion valve device 60 where the flow of the refrigerant is throttled down to the low side pressure. The operation of valve 60 will be explained in more detail hereinafter.

When the refrigerant enters the low side, it starts to boil and as a boiling liquid the refrigerant flows through pipe 58 to the expansion coils of the evaporator 50. Here the boiling becomes vigorous, due to the heat imparted to the refrigerant from the coolant liquid or aqueous organic solution in tank 21, which is giving up its heat through the coils of the evaporator 50. This is all going on at low temperature.

With the flow of the refrigerant properly controlled by the expansion valve device 60, all of the refrigerant will be evaporated in the coils of the evaporator 50 and the Freon will be entirely in a gaseous state as it enters the pipe 51 and is drawn back into the compressor 46. In fact the refrigerant will be superheated at this point in the system, and the superheat from the refrigerant causes the fluid in bulb 78 to expand. The increased pressure of the expanding fluid is transmitted through the fluid in pipe 79 to effect operation of the expansion valve device 60 so as to control the flow of refrigerant through the system in the above described manner. Thus fluctuations in the temperature of the refrigerant entering the pipe 51 will cause corresponding fluctuations in the pressure of the fluid in bulb 78, thereby controlling opening and closing of the expansion valve device 60.

The refrigerant or Freon gas enters the compressor 46, is compressed to a small volume at a high pressure and at a high temperature. This hot gas then passes through pipe 49 into the condenser 48 where the heat of compression is removed. The gas condenses just like steam in a radiator, and the liquid falls into the receiver and the refrigerant cycle is complete.

During the refrigerating cycle it is to be noted that the refrigerant picks up heat in the evaporator coils 50, which chills the coolant liquid or aqueous organic solution in the tank 21, and discharges said heat in the condenser 48.

Included in the electric circuit through which the magnetic switch device 103 of the compressor motor 47 is energized, is a high-low pressure switch device 108, shown in detail in Fig. 5.

The switch device 108 comprises a casing having a bellows 109 mounted in one side wall thereof and extending into the casing.

Leading from the end of the bellows 109 adjacent to the wall of the casing and connected to the low pressure pipe 51 of the refrigerating mechanism, is a pipe 110. The bellows 109 and pipe 110 are so constructed and arranged that both of said elements contain fluid from the low pressure side of the compressor 46.

Mounted on the opposite side wall of the casing of the switch device 108 is a bellows 111, similar in construction to the construction of the bellows 109, and leading from the end of the bellows adjacent to the wall of the casing and connected to the high pressure pipe 49 of the refrigerating mechanism, is a pipe 112.

An arm 113 is pivotally mounted within the casing of the switch device 108, as indicated at 114, and said arm is held by a spring 115 against a lug 116 on the inner end of the bellows 109.

Associated with the bellows 111, is an arm 117 which is pivotally mounted in the casing of the switch device 108, as indicated at 118.

A spring 120 normally pulls arm 117 towards the left, as viewed in Fig. 5.

Mounted within the casing 108 in proximity to the arm 113 and suitably insulated from the structural parts of the device, is a fixed contact 121 which is connected to a terminal of switch 102, by a wire 122.

A similar fixed contact 123 is mounted in the casing 108 in proximity to the arm 117, said contact 123 being suitably insulated from its mounting. Contact 123 is connected by a wire 124 to a terminal of the solenoid coil of the magnetic switch device 103.

The arm 113 carries an electrical contact point 125 which is normally held in engagement with the fixed contact 121, by the expansion of the bellows 109 under influence of fluid pressure from the low pressure side of the compressor 46. This action of the bellows 109 maintains the spring 115 under tension.

The arm 117 carries an electrical contact point 126 which is normally held in engagement with the fixed contact 123 by the spring 120. The element 119 of the bellows 111 is out of engagement with arm 117 when contacts 123, 126 are engaged.

Contacts 125 and 126 are electrically connected together by a wire 127.

The switch device 108 operates as follows:

When there is normal fluid pressure in pipes 110 and 112, contacts 121, 125 and contacts 123, 126 will be closed, and the circuit between the wires 122, 124 will be closed. The motor 47 will thus operate the compressor 46 as long as switch 102 is closed.

If, however, the fluid pressure in pipe 110 becomes lower than desired, the bellows 109 will retract lug 116, so that spring 115 pulls the arm 113 towards the right (Fig. 5) thereby breaking the contact between points 121 and 125. In this way the circuit through which the solenoid 128 of the magnetic switch device 103 is energized by electric energy supplied by lines 31, 32, will be opened, thereby deenergizing said solenoid so as to effect opening of the source of supply of current to the compressor motor 47. The compressor 46 will now cease operating.

On the other hand when the fluid pressure in pipe 112 on the high pressure side of the device exceeds a predetermined amount, bellows 111 will expand thereby swinging the arm 117 towards the right (Fig. 5) and breaking the contact between points 123 and 126. In this way the circuit through which the solenoid 128 is energized will be opened and compressor motor 47 will cease operating.

In the above described manner, the pressure switch device 108 fulfills its function of causing the compressor 46 to stop, when (1) there is too low fluid pressure in the suction line 51, or (2) when the pressure builds up too high in the discharge side of the compressor. When the fluid pressures on the opposite sides of the compressor 46 return to normal, the bellows 109, 111 will respond to such pressure changes with the result that the contacts of the switch device 108 will again close, thereby enabling the compressor to function in the manner heretofore described.

Coolant cycle

When the apparatus is shut down the coolant liquid in tank 21 will be at approximately room temperature.

At the same time that the compressor 46 is started up in the manner heretofore described, switch 33 should be actuated to start the motor of pump 26.

The pump operates continuously.

The solenoid 43 of the control valve device 36 is deenergized when the apparatus is first put into operation, so that the valve 42 is not held seated.

The coolant liquid or aqueous organic solution as it is discharged from the pump 26, is recirculated directly over the evaporator coils in tank 21.

The circuit through which the coolant liquid circulates is from the inlet side of the pump 26 at the bottom of the tank 21, up through pipe 28 to T 27, and from thence through pipe 40, valve device 36, and pipe 38 to the upper portion of the tank 21.

By recirculating the coolant liquid in this manner the temperature of the liquid is gradually reduced to a predetermined temperature, determined by the season of the year and the room temperature where the apparatus is installed.

When the predetermined temperature of the coolant liquid is attained, the compressor 46 is shut down automatically. This is accomplished in the following manner. When the temperature of the coolant liquid has dropped the desired amount, the contraction of the fluid in bulb 94 will cause the thermostat switch 66 to open the circuit between lines 86 and 88, as hereinafter described in detail. When the circuit between lines 86 and 88 is broken, it causes the solenoid to be deenergized, whereupon valve 59 closes. Since valve 59 is closed, the compressor 46 will cause a partial vacuum to be pulled in the pipes 51 and 110. As previously described, the reduced pressure in pipe 110, see Fig. 5, causes contraction of bellows 109, so that spring 115 pulls the arm 113 towards the right thereby breaking the contact between points 121 and 125. This opens the circuit through the solenoid 128, in consequence of which solenoid 128 is deenergized and opens the switch 103, whereby operation of the compressor 46 is halted.

If the coolant liquid heats up, due to heat leakage through the insulated walls of the tank 21 or the heat generated as the result of the recirculation of the coolant liquid through the tank 21, in the manner above described, the compressor 46 will be automatically started up, bringing the coolant liquid in the tank 21 back to the predetermined or desired temperature.

When the mixer machine 11 is started the operator, as the result of previous experience, determines the length of time the coolant liquid should be circulated through the chamber 129 of the mixer bowl, in order that the dough will be discharged from the mixer at the desired temperature. Since there is very little heat generated during the early stages a batch of dough is being mixed the dough does not pick up much heat and it is only during the last part of the mixing period that any appreciable refrigeration is required to keep the mass of dough from overheating in the mixer bowl. Consequently, after a batch has been in the mixer during the initial period in which no appreciable amount of heat is generated, the operator sets the hand or element 101 of the timer 97 for the period of time it is desired the coolant liquid to circulate through the mixer chamber 129. The timer device 97 then actuates the movable switch arm 98 of the switch 44 to close the switch, thereby energizing solenoid 43 of the valve device 36. Valve 42 is now held seated, and as the result the coolant liquid is forced by pump 26 to the mixer chamber 129 by way of pipe 22, and returns to the tank 21 after circulating through said mixer chamber, through pipe 23.

An incandescent lamp 131 is interposed in the circuit between switch device 44 and solenoid 43, so that when the switch is closed by timer 97 the operator will note that the pump 26 is circulating the coolant liquid through the mixer bowl chamber 129.

After the timer device 97 has run for the length of time for which it has been set, it throws switch arm 98 to open position, so that the solenoid 43 is deenergized. Deenergization of the solenoid 43, as previously explained, permits the valve member 42 of valve device 36 to be moved from its seat. The coolant liquid then substantially ceases circulating through the mixer chamber 129 and resumes its recirculating cycle through pipes 28, 40, 38 and the tank 21 in the manner heretofore described. As is apparent from Fig. 1, the resistance to flow of coolant liquid through the recirculating pipes 40 and 38 is less than the resistance to flow of the coolant liquid through pipe 22, jacket 129 and pipe 23, whereby the jacket 129 is by-passed and the coolant liquid is caused to recirculate. This recirculating cycle continues during the intermission between mixes and during the initial periods of successive mixes until the timer device element 101 is again set to effect closing of the electrical circuit of the valve device 36. During this time the coolant liquid in tank 21 is being defrigerated and restored to its original predetermined or desired temperature. The apparatus should be designed so as to have sufficient capacity to reach this desired temperature two or three minutes before the subsequent batch is started in the mixer. It is desirable to provide this time element as a safety factor.

The temperature of the dough in the mixer bowl 12 is controlled by the length of time which the coolant liquid is circulated through chamber 129. The temperature of the coolant liquid is at a fixed temperature when circulation through the chamber 129 is started.

When the operator finds the dough is becoming too warm, he increases the length of time the coolant liquid is circulated through chamber 129 by increasing the setting of the element 101 of timer 97. Conversely, if the dough becomes too cold the time during which the coolant liquid is circulated through chamber 129 is reduced. Experience will very soon indicate to the operator the proper amount of time required to circulate the coolant liquid through chamber 129 so as to obtain dough of the desired temperature.

The switch device 66, which controls the means by which the coolant liquid is maintained at a desired fixed temperature, comprises two arms 81, 82, disposed within a suitable casing, arm 81 being pivotally mounted, as indicated at 83 and arm 82 being pivotally mounted, as indicated at 84, all as shown in Figure 4.

The arm 81 carries an electric contact element 85 which is connected to power line 31, by a wire 86.

Arm 82 also carries an electric contact element 87 which is connected to one terminal of the coil of solenoid 65, by a wire 88. The other terminal of the solenoid coil is connected to the power line 32, by wire 89.

The two contact elements 85, 87 are so arranged on the arms 81, 82, respectively, that when arm 82 is swung about its pivot 84 towards arm 81, said elements will contact thereby closing the circuit by which the solenoid device 65 is energized.

Arm 81 is adapted to be maintained in a predetermined position, but this position can be adjusted.

Acting against one side of arm 81 is a coiled spring 90. This spring tends to force the free end of arm 81 into engagement with the lower end of a stem 91. The upper end of stem 91 is formed with a knurled knob 92 and said stem is formed with screw threads for threaded engagement with a screw threaded opening in the wall of the casing of the switch device 66. By turning the knob 92 the arm 81 can be disposed in the desired position.

For the purpose of actuating arm 82 a thermal device is provided.

The thermal device comprises a bellows or similar expansible element 93, a capillary tube 95, and a bulb 94, the bottom or base of said bellows being fixed to the bottom of the casing of the switch device 66.

The upper end of the bellows 93 carries a contact member 130 which is adapted to bear against the outer end of the arm 82.

The bellows 93, tube 95 and bulb 94 are all connected together and form a completely integrated system. This system is filled with a nonfreezing liquid, such as alcohol, which expands when the temperature rises and contracts when the temperature falls. The increase in volume of alcohol is in direct ratio to the temperature. For every degree (Fahrenheit) that alcohol is heated it increases its volume a definite amount.

Inasmuch as the bulb 94 and the tube 95 are rigid and cannot expand, the expansion of the alcohol will occur in the bellows 93, such expansion changing the position of the contact member 130, by raising it, or increasing the distance between the top and the bottom of the bellows.

The operation of the switch device 66 is as follows:

Assuming that the elements 93, 94 and 95 are charged with alcohol at zero degrees Fahrenheit, then the contact member 130 will be in the position shown in Fig. 4, by full lines.

When it is desired to control the temperature of the coolant liquid in tank 21 at 10 degrees F., the bellows 93 will expand and the contact member 130 will be disposed at the position shown by broken lines in Fig. 4.

A further increase or rise in temperature will cause the elements 85 and 87 to make contact, thereby completing the electric circuit through which the solenoid 65 of the valve device 59 is energized. Valve element 64 will thus be unseated permitting flow of Freon through the refrigerating system. This results in the compressor 46 being started up, since this will again build up the pressure in pipes 51 and 110 to the point where the arm 113 is moved to the left to close the contacts 121 and 125 and thereby closing the circuit through the solenoid 128 and closing switch 103.

When it is desired to control the temperature of the coolant liquid in tank 21 at 20 degrees F., instead of 10 degrees F., the knob 92 is operated to permit the spring 90 to move the arm 81 upwardly to a position such as the position indicated by broken lines in Fig. 4. This increases the set distance between contact points 85 and 87 so that before electrical contact of these elements 85 and 87 can be made, the coolant liquid in the tank 21 will have to heat up an additional 10 degrees F. In other words, the set screw 92 is used to position contact 85 in relation to the base of the bellows 93, and in this way sets the temperature at which the temperature of the coolant liquid in tank 21 will be controlled. By screwing the set screw 92 down, the temperature of the coolant liquid in tank 21 will be maintained at a lower temperature, and by turning the set screw 92 in the reverse direction the temperature of the coolant liquid in the tank 21 can be maintained at a predetermined higher temperature. In this way the switch device 66 can be adjusted to maintain the temperature of the coolant liquid in the tank 21 at the desired temperature required for operation of the apparatus.

The temperature of the coolant liquid in tank 21 is set at a desired fixed point, depending upon the season of the year. The temperature at which the coolant liquid in tank 21 is maintained substantially constant through the operation of the switch device 66, may remain the same for a period extending over several weeks or even months. With the temperature of the coolant liquid in tank 21 thus fixed, the baker or operator of the apparatus controls the temperature of the dough being mixed by the length of time the coolant liquid is permitted to circulate through the mixer bowl chamber 129. The control of the temperature of the coolant liquid in tank 21 is only to facilitate the operation of the apparatus during the winter and during the summer, or when radically different types of dough are being mixed. The length of time the coolant liquid is circulated through the mixer bowl chamber 129 is the real controlling factor. The setting of the temperature of the coolant liquid in tank 21 is actually for convenience of operation.

The present invention has certain advantages over apparatus heretofore provided for maintaining bread dough at desired temperatures, among which advantages may be mentioned the following:

The jacketed chamber 129 of the mixer bowl is cooled by a fluid medium at a low pressure, and, therefore, no structural change is required in the construction of the mixer bowl. The present invention can be installed on any jacketed mixer without changing its design.

The flexible connection between the mixer and the tank 21 for the coolant liquid being for low liquid pressure, can be of simple rubber hose connections.

The coolant liquid used, being organic in nature, will not pit the mixer bowl.

A storage receiver or reservoir is provided by the tank 21, and by recirculating the coolant liquid in said tank, continuous use can be made of the refrigerating unit. This makes possible the use of a smaller compressor unit than is necessary in direct expansion apparatus. Consequently, less floor space is required for the present apparatus as compared to the floor space required for other types of apparatus for a similar purpose.

The control of the temperature of the coolant liquid is simple because of the thermal inertia or slow rate of rise in temperature of the aqueous organic solution as compared to the vapor of a direct expansion cooling system.

The operation of the compressor 46 is less frequent and shock loads eliminated. Easier maintenance and no delicate controls required.

All connections through which the refrigerant passes are rigid. This eliminates high pressure flexible connections.

Because the heat transfer coefficient is much higher between a liquid and metal, than between gaseous refrigerant and metal, more heat can be removed from the dough by circulating the coolant liquid through the chamber 129 with an equal temperature differential.

Since the coolant liquid is organic, copper can be used for primary heat transfer surfaces, and the several valve devices can be of standard design.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment therefore is to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described my invention what I claim and desire to secure by Letters Patent is:

1. The combination with a dough mixer having a jacketed chamber, of a tank containing a coolant liquid, fluid connection means between the tank and the jacketed chamber of the mixer whereby coolant liquid from the tank can circulate through the jacketed chamber of the mixer, a by-pass from said fluid connection to said tank by-passing said jacketed chamber, a pump having an inlet disposed in the bottom portion of the tank and an outlet connected to said fluid connection means for circulating the coolant liquid, said pump being adapted to operate continuously, means for controlling the flow of coolant liquid selectively through said jacketed chamber or said by-pass, a timer device for controlling the operation of said fluid flow controlling means whereby said fluid flow controlling means will function to permit the coolant liquid to circulate through the jacketed chamber of the mixer during a definite portion of the mixing period, and means for maintaining the coolant liquid in the tank at a substantially uniform temperature.

2. The combination with a dough mixer having a jacketed chamber, of a tank containing a coolant liquid, a delivery conduit and a return conduit connecting the tank and the jacketed chamber whereby coolant liquid from the tank can circulate through the jacketed chamber and then return to the tank, a by-pass from said delivery conduit to said tank by-passing said jacketed chamber, a pump mounted within said tank and having an outlet connected to said delivery conduit for circulating the coolant liquid, said pump being adapted to operate continuously, a valve device for controlling the flow of coolant liquid selectively through said jacketed chamber or said by-pass, a timer device for controlling the operation of said valve device whereby said valve device will function to permit the coolant liquid to circulate through the jacketed chamber of the mixer during a definite portion of the mixing period, and means for maintaining the coolant liquid in the tank constantly at a substantially predetermined temperature.

3. The combination with a dough mixer having a jacketed chamber, of a tank separate from the mixer and containing a coolant liquid, a coolant liquid circulating system comprising a delivery conduit and a return conduit connecting said tank and said jacketed chamber, a by-pass conduit connecting said delivery conduit and said tank arranged to offer less resistance to flow of coolant liquid therethrough than said circulating system, means for circulating the coolant liquid, and a valve device in said by-pass conduit arranged when closed to effect flow of coolant liquid through said circulating system and when open to effect flow of coolant liquid through said by-pass conduit.

4. In combination, a dough mixer provided with a mixing chamber having a wall, a coolant liquid circulating system, a portion of said system being in heat transfer relation with said wall, a by-pass in said circulating system, valve means in said by-pass arranged in one position to provide for circulation of coolant liquid in heat transfer relation with said wall and in another position to by-pass coolant liquid from said wall, control means to maintain the valve in position for by-passing coolant liquid for a predetermined interval after starting the operation of said mixer and to maintain the valve in position for circulating coolant fluid in heat transfer relation with said wall after said interval.

5. The combination with a dough mixer having a jacketed chamber, of a tank containing a coolant liquid, coolant liquid delivery and return conduits connecting said tank and said jacketed chamber, means for circulating the coolant liquid through said tank, conduits and jacketed chamber, means operable to interrupt circulation of coolant liquid through said jacketed chamber, and timer mechanism controlling the functioning of said last named means to effect circulation and to interrupt circulation of coolant liquid through said jacketed chamber for predetermined intervals of time.

6. The combination with a dough mixer having a jacketed chamber, of a tank separate from the mixer and containing a coolant liquid, a coolant liquid circulating system connecting said tank and said jacketed chamber including means for by-passing said jacketed chamber, a pump for circulating said coolant liquid, means for selectively controlling the flow of coolant liquid to circulate through said jacketed chamber or to by-pass said jacketed chamber, a timer device for controlling the operation of said last named means whereby said last named means will function to effect circulation of the coolant liquid through said jacketed chamber during a predetermined portion of the mixing period.

7. The combination with a dough mixer having a jacketed chamber, of a tank separate from the mixer and containing a coolant liquid, fluid connection means between the tank and the jacketed chamber whereby coolant liquid from the tank can circulate through the jacketed chamber and then return to the tank and a by-pass from said fluid connection to said tank by-passing said jacketed chamber, a pump mounted within the tank and having an outlet connected to said fluid connection means for circulating the coolant liquid, a valve device for controlling the flow of coolant liquid through said fluid connection means between the tank and the jacketed chamber and through said by-pass, and means for controlling the operation of said valve device whereby the valve device is operated to cause the coolant liquid to circulate through the by-pass and the tank without circulating through the jacketed chamber of the mixer during a definite portion of the mixing period.

8. The combination with a dough mixer having a jacketed chamber, of a tank separate from the mixer and containing a coolant liquid, fluid connection means between the tank and the jacketed chamber whereby coolant liquid from the tank can circulate through the jacketed chamber and then return to the tank and a by-pass from said fluid connection to said tank by-passing said jacketed chamber, a pump mounted within the tank and having an outlet connected to said fluid connection means for circulating the coolant liquid, a valve device for controlling the flow of coolant liquid through said fluid connection means between the tank and the jacketed chamber and through said by-pass, means for controlling the operation of said valve device whereby the valve device is operated to cause the coolant liquid to circulate through the by-pass and the tank without circulating through the jacketed chamber of the mixer during a definite portion of the mixing period, and refrigerating means operatively connected to said tank for maintaining the coolant liquid in the tank at a substantially predetermined temperature.

9. The combination with a dough mixer having a jacketed chamber, of a tank separate from the mixer and containing a coolant liquid, fluid connection means between the tank and the jacketed chamber of the mixer whereby coolant liquid from the tank can circulate through the jacketed chamber and a by-pass from said fluid connection to said tank by-passing said jacketed chamber, a pump having an inlet disposed in the bottom portion of the tank and an outlet connected to said fluid connection means for circulating the coolant liquid, means for controlling the flow of coolant liquid through said fluid connection means comprising a valve device installed in said by-pass, said valve being normally in position to provide for flow of coolant liquid through said by-pass and to prevent flow of coolant liquid to said jacketed chamber, means for moving said valve to a position to provide for flow of coolant liquid to said jacketed chamber for a predetermined period of time, including, an electromagnetic device for operating said valve device, a switch device for controlling the operation of said electromagnetic device, a timer device for controlling the operation of said switch device and refrigerating means for maintaining the coolant liquid in the tank at a substantially uniform temperature.

10. The combination with a dough mixer having a jacketed chamber, of a tank separate from the mixer and containing a coolant liquid, a delivery conduit and a return conduit connecting the tank and the jacketed chamber whereby coolant liquid from the tank can circulate through the jacketed chamber and then return to the tank and a by-pass from said delivery conduit to said tank by-passing said jacketed chamber, a pump mounted within the tank and having an outlet connected to said delivery conduit for circulating the coolant liquid, means for controlling the flow of coolant liquid through said conduits comprising a valve device installed in said by-pass, said valve being normally in position to provide for flow of coolant liquid through said by-pass and to prevent flow of coolant liquid to said jacketed chamber, means for moving said valve to a position to provide for flow of coolant liquid to said jacketed chamber for a predetermined period of time, including an electromagnetic device for operating said valve device and a switch device for controlling the operation of said electromagnetic device.

11. The combination with a dough mixer having a wall, of a coolant liquid circulating system in heat transfer relation to said wall, means associated with said circulating system to interrupt circulation of coolant liquid in heat transfer relation to said wall, timer mechanism controlling the functioning of said last named means to render said interrupting means effective for a predetermined interval after starting the operation of said mixer, and ineffective to interrupt said circulating system thereafter, a refrigerant circulating system in heat transfer relation with said coolant liquid, and means including an element responsive to the temperature of said coolant liquid controlling the flow of refrigerant through said refrigerant circulating system.

12. In the method of mixing in a mixing chamber a mass of bread dough ingredients having a normal tendency to rise in temperature during the mixing action, the steps including introducing the ingredients of said mass of material into said chamber, mixing the contents of said chamber at prevailing temperature for the first sixty percent to seventy-five percent of the total mixing time of said mass of material, and mixing the contents of said chamber for the remainder of the total mixing time while cooling the outer wall of said chamber.

13. The combination with a dough mixer having a wall, of a coolant liquid circulating system in heat transfer relation to said wall, a refrigerant circulating system in heat transfer relation with said coolant liquid, means responsive to the temperature of said coolant liquid, and an electro-magnetic valve mounted in said refrigerant circulating system operated by said temperature responsive means to close said valve upon said coolant liquid reaching a predetermined temperature.

DWIGHT TENNEY.

REFERENCES CITED

The following references are of record in the file of this patent:

UNITED STATES PATENTS

| Number | Name | Date |
|---|---|---|
| 1,725,036 | Wihlfahrt | Aug. 20, 1929 |
| 1,896,953 | Hassell | Feb. 7, 1933 |
| 2,118,500 | Ferenci | May 24, 1938 |
| 2,252,173 | Gibson | Aug. 12, 1941 |
| 2,292,692 | Huber | Aug. 11, 1942 |
| 2,315,230 | Sticelber | Mar. 30, 1943 |
| 2,437,332 | Newton | Mar. 9, 1948 |